(12) United States Patent
Moore

(10) Patent No.: US 9,782,640 B2
(45) Date of Patent: *Oct. 10, 2017

(54) ADJUSTABLE CONNECTOR

(75) Inventor: Simon Garry Moore, Cambridge (NZ)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/594,278

(22) Filed: Aug. 24, 2012

(65) Prior Publication Data

US 2013/0053161 A1 Feb. 28, 2013

Related U.S. Application Data

(63) Continuation of application No. 12/677,238, filed as application No. PCT/NZ2008/000233 on Sep. 10, 2008.

(30) Foreign Application Priority Data

Sep. 10, 2007 (NZ) ........................................ 561380

(51) Int. Cl.
*A63B 53/02* (2015.01)
*F16L 27/02* (2006.01)
(Continued)

(52) U.S. Cl.
CPC .............. *A63B 53/02* (2013.01); *A63B 53/00* (2013.01); *A63B 53/047* (2013.01);
(Continued)

(58) Field of Classification Search
USPC ............. 473/226–350; 280/86.756; 403/352, 403/DIG. 8
See application file for complete search history.

(56) References Cited

U.S. PATENT DOCUMENTS 1,019,657 A 3/1912 Kerr
1,266,529 A 5/1918 Mattern
(Continued)

FOREIGN PATENT DOCUMENTS

GB 392493 5/1933
GB 443439 2/1936
(Continued)

OTHER PUBLICATIONS

Decision of BPAI regarding Appeal No. 2010-008534.*
(Continued)

*Primary Examiner* — Victor MacArthur
(74) *Attorney, Agent, or Firm* — Quinn IP Law

(57) ABSTRACT

According to one aspect of the present invention there is provided an adjustable connector including at least two parts, each having a main body with a bore having a longitudinal axis therein, wherein an external surface of the main body of a first part is configured to bear against an internal surface of the bore of a second part when the first part is at least partially inserted into the bore of the second part to form a connection, characterized in that the positioning of the bores with respect to the main bodies is such that when the parts are connected to each other, rotation of one part with respect to the other changes the inclination of the longitudinal axes of the bores with respect to one another.

17 Claims, 12 Drawing Sheets

(51) Int. Cl.
*F16L 37/10* (2006.01)
*A63B 53/00* (2015.01)
*A63B 53/04* (2015.01)
*A63B 60/42* (2015.01)
*A63B 53/06* (2015.01)
*A63B 53/14* (2015.01)
*A63B 60/22* (2015.01)

(52) U.S. Cl.
CPC .......... *A63B 53/0466* (2013.01); *A63B 60/42* (2015.10); *F16L 27/02* (2013.01); *F16L 37/103* (2013.01); *A63B 53/06* (2013.01); *A63B 53/14* (2013.01); *A63B 60/22* (2015.10); *A63B 2053/023* (2013.01); *A63B 2053/025* (2013.01); *A63B 2053/026* (2013.01); *A63B 2209/14* (2013.01); *A63B 2210/50* (2013.01); *A63B 2210/58* (2013.01); *Y10T 403/7039* (2015.01)

(56) References Cited

U.S. PATENT DOCUMENTS

| | | | |
|---|---|---|---|
| 1,792,852 A | 12/1926 | Mattern | |
| 1,623,523 A | 4/1927 | Bourke | |
| 1,634,082 A | 6/1927 | Rigby | |
| 1,850,843 A | 3/1932 | Lagerblade | |
| 2,067,556 A | 1/1937 | Wettlaufer | |
| 2,219,670 A | 10/1940 | Wettlaufer | |
| 2,451,262 A | 10/1948 | Watkins | |
| 2,464,850 A | 3/1949 | Crawshaw | |
| 3,206,206 A | 9/1965 | Santosuosso | |
| 3,516,697 A | 6/1970 | Hahn | |
| 3,524,646 A | 8/1970 | Wheeler | |
| 3,656,366 A | 4/1972 | Somero | |
| 3,848,737 A | 11/1974 | Kenon | |
| 3,891,212 A | 6/1975 | Hill | |
| RE29,376 E | 8/1977 | Hiszpanski | |
| 4,253,666 A | 3/1981 | Murphy | |
| 4,340,227 A | 7/1982 | Dopkowski | |
| 4,420,272 A * | 12/1983 | Ingalls et al. | 403/4 |
| 4,641,853 A * | 2/1987 | Specktor et al. | 280/86.756 |
| 4,664,382 A | 5/1987 | Palmer et al. | |
| 4,831,744 A * | 5/1989 | Specktor et al. | 33/600 |
| 4,854,582 A | 8/1989 | Yamada | |
| 4,872,699 A * | 10/1989 | Grove et al. | 280/86.753 |
| 4,948,132 A | 8/1990 | Wharton | |
| 4,958,834 A | 9/1990 | Colbert | |
| 4,984,794 A | 1/1991 | Pernelle et al. | |
| 5,165,688 A | 11/1992 | Schmidt | |
| 5,232,224 A | 8/1993 | Zeider | |
| 5,275,399 A | 1/1994 | Schmidt | |
| 5,275,408 A | 1/1994 | Desbiolles et al. | |
| 5,429,355 A | 7/1995 | Schmidt | |
| 5,433,442 A | 7/1995 | Walker | |
| 5,577,726 A | 11/1996 | Fenton | |
| 5,588,921 A | 12/1996 | Parsick | |
| 5,626,528 A | 5/1997 | Toulon | |
| 5,792,002 A | 8/1998 | Bothwell | |
| 5,839,973 A | 11/1998 | Jackson | |
| 5,851,155 A | 12/1998 | Wood et al. | |
| 5,855,526 A | 1/1999 | Honma | |
| 5,906,549 A | 5/1999 | Kubica | |
| 5,951,411 A | 9/1999 | Wood et al. | |
| 6,050,034 A * | 4/2000 | Krinner | 52/155 |
| 6,095,929 A | 8/2000 | Clark | |
| 6,149,533 A | 11/2000 | Finn | |
| 6,203,443 B1 | 3/2001 | Britton | |
| 6,251,028 B1 | 6/2001 | Jackson | |
| 6,270,425 B1 | 8/2001 | Dyer | |
| 6,273,828 B1 | 8/2001 | Wood et al. | |
| 6,287,215 B1 | 9/2001 | Fisher | |
| 6,319,146 B1 | 11/2001 | Mills | |
| 6,332,945 B1 | 12/2001 | Lenhof | |
| 6,368,230 B1 | 4/2002 | Helmstetter et al. | |
| 6,447,404 B1 | 9/2002 | Wilbur | |
| 6,475,100 B1 | 11/2002 | Helmstetter et al. | |
| 6,508,288 B2 | 1/2003 | Lenhof | |
| 6,547,673 B2 | 4/2003 | Roark | |
| 6,652,388 B1 | 11/2003 | Lenhof | |
| 6,669,573 B2 | 12/2003 | Wood et al. | |
| 6,769,994 B2 | 8/2004 | Boone | |
| 6,797,106 B2 | 9/2004 | Lenhof | |
| 6,863,622 B1 | 3/2005 | Hsu | |
| 6,890,269 B2 | 5/2005 | Burrows | |
| 7,017,252 B2 | 3/2006 | Lenhof | |
| 7,056,225 B1 | 6/2006 | Pipkin | |
| 7,083,529 B2 | 8/2006 | Cackett | |
| 7,115,046 B1 | 10/2006 | Evans | |
| 7,144,330 B2 | 12/2006 | Wade | |
| 7,210,693 B2 * | 5/2007 | Ingalls et al. | 280/86.756 |
| 7,300,359 B2 | 11/2007 | Hocknell | |
| 7,316,622 B1 | 1/2008 | Lucas | |
| 7,326,126 B2 | 2/2008 | Holt | |
| 7,331,589 B2 * | 2/2008 | Ingalls et al. | 280/86.756 |
| 7,335,113 B2 | 2/2008 | Hocknell | |
| 7,344,449 B2 | 3/2008 | Hocknell et al. | |
| 7,476,160 B2 | 1/2009 | Hocknell et al. | |
| 7,568,711 B2 * | 8/2009 | Houser et al. | 280/86.756 |
| 7,699,717 B2 | 4/2010 | Morris et al. | |
| 7,704,156 B2 | 4/2010 | Stites et al. | |
| 7,704,158 B2 | 4/2010 | Burrows | |
| 7,722,474 B2 | 5/2010 | Thomas et al. | |
| 7,722,475 B2 | 5/2010 | Thomas et al. | |
| 7,789,766 B2 | 9/2010 | Morris et al. | |
| 7,789,769 B2 | 9/2010 | Sugimoto | |
| 7,887,431 B2 | 2/2011 | Beach et al. | |
| 7,931,542 B2 | 4/2011 | Kusumoto | |
| 7,955,182 B2 | 6/2011 | Thomas et al. | |
| 7,955,184 B2 | 6/2011 | Stites et al. | |
| 7,955,185 B2 | 6/2011 | Tavares et al. | |
| 7,963,856 B2 | 6/2011 | Yamamoto | |
| 7,980,959 B2 | 7/2011 | Morris et al. | |
| 8,002,644 B2 | 8/2011 | Hocknell et al. | |
| 8,182,357 B2 * | 5/2012 | Moore | 473/246 |
| 2002/0037773 A1 | 3/2002 | Wood et al. | |
| 2004/0018886 A1 | 1/2004 | Burrows | |
| 2004/0018887 A1 | 1/2004 | Burrows | |
| 2004/0023728 A1 | 2/2004 | Drossos | |
| 2005/0049072 A1 | 3/2005 | Burrows | |
| 2005/0280229 A1 * | 12/2005 | Ingalls et al. | 280/86.756 |
| 2006/0105855 A1 | 5/2006 | Cackett et al. | |
| 2006/0183564 A1 | 8/2006 | Park | |
| 2006/0281575 A1 | 12/2006 | Hocknell et al. | |
| 2006/0293116 A1 | 12/2006 | Hocknell et al. | |
| 2007/0004528 A1 | 1/2007 | Hocknell et al. | |
| 2007/0004541 A1 | 1/2007 | Price et al. | |
| 2007/0078026 A1 | 4/2007 | Holt et al. | |
| 2007/0152417 A1 * | 7/2007 | Ingalls et al. | 280/86.756 |
| 2007/0265106 A1 | 11/2007 | Burrows | |
| 2008/0051211 A1 | 2/2008 | Hocknell | |
| 2008/0058114 A1 | 3/2008 | Hocknell | |
| 2008/0070717 A1 | 3/2008 | Hocknell et al. | |
| 2008/0268977 A1 | 10/2008 | Cole et al. | |
| 2008/0280693 A1 | 11/2008 | Chai | |
| 2009/0011848 A1 | 1/2009 | Thomas et al. | |
| 2009/0011849 A1 | 1/2009 | Thomas et al. | |
| 2009/0011850 A1 | 1/2009 | Stites et al. | |
| 2009/0062029 A1 | 3/2009 | Stites et al. | |
| 2009/0075748 A1 | 3/2009 | Evans et al. | |
| 2009/0156323 A1 | 6/2009 | Yamamoto | |
| 2009/0181791 A1 | 7/2009 | Sanchez et al. | |
| 2009/0197694 A1 | 8/2009 | Soracco et al. | |
| 2009/0239676 A1 | 9/2009 | Bennett et al. | |
| 2009/0286618 A1 | 11/2009 | Beach et al. | |
| 2009/0286619 A1 | 11/2009 | Beach et al. | |
| 2010/0035701 A1 | 2/2010 | Kusumoto | |
| 2010/0041491 A1 | 2/2010 | Thomas et al. | |
| 2010/0197422 A1 | 8/2010 | Thomas et al. | |
| 2010/0197423 A1 | 8/2010 | Thomas et al. | |
| 2011/0111874 A1 * | 5/2011 | Thomas et al. | 473/226 |
| 2011/0123265 A1 * | 5/2011 | Moore | 403/361 |
| 2012/0077614 A1 * | 3/2012 | Moore | 473/307 |
| 2012/0165110 A1 * | 6/2012 | Cheng | 473/305 |

(56) References Cited

U.S. PATENT DOCUMENTS

2012/0165111 A1\*  6/2012  Cheng .......................... 473/305
2012/0295733 A1\* 11/2012  Bennett et al. ............... 473/307
2013/0053161 A1\*  2/2013  Moore .......................... 473/244

FOREIGN PATENT DOCUMENTS

| GB | 751323     | 6/1956  |
|----|------------|---------|
| GB | 2331464    | 5/1999  |
| JP | 2000024143 | 1/2000  |
| JP | 2005270402 | 10/2005 |
| JP | 2006042950 | 2/2006  |
| JP | 2006042951 | 4/2006  |
| NZ | 575598     | 3/2009  |
| WO | 9000424    | 1/1990  |
| WO | 9609856    | 4/1996  |
| WO | 2007022671 | 3/2007  |
| WO | 2009009262 | 1/2009  |
| WO | 2009035345 | 3/2009  |

OTHER PUBLICATIONS

Decision of BPAI regarding Appeal No. 2013-009641.\*
Puku, Technology Update Article, Mar. 23, 2009, pp. 1-5.
European Search Report in related European Application No. 08830229.4; dated Feb. 21, 2012.

\* cited by examiner

DETAIL A
SCALE 3 : 1

FIGURE 9
A
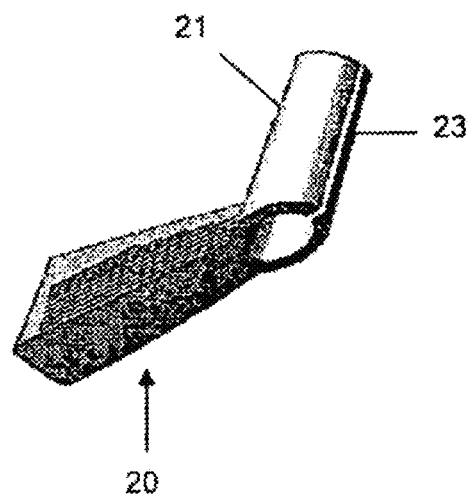
B
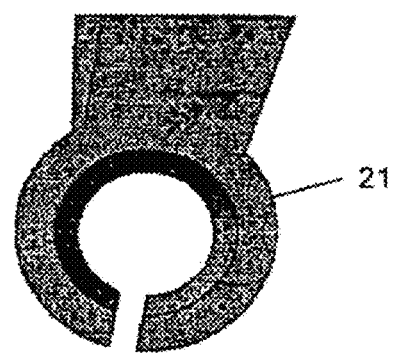
C
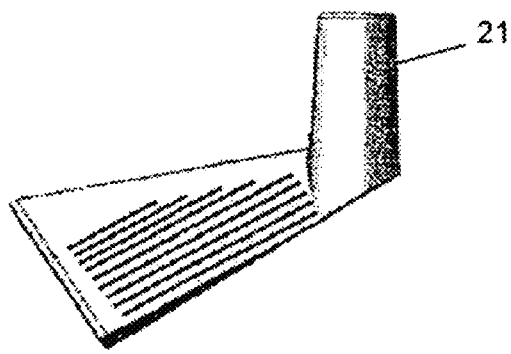
D
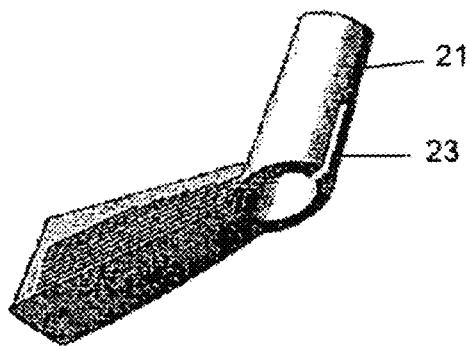

ADJUSTABLE CONNECTOR

RELATED APPLICATIONS

This application is a continuation application of U.S. patent application Ser. No. 12/677,238 filed Dec. 2, 2010, which is hereby incorporated by reference in its entirety.

TECHNICAL FIELD

The present invention relates to an adjustable connector. In particular, it relates to an adjustable connector for connecting and orienting two or more bodies with respect to one another.

BACKGROUND ART

The relative orientation of two or more connected objects often can be a critical aspect of the way the objects perform their function. This may be illustrated simply with reference to a golf club, although those skilled in the art will recognize numerous other products and situations where similar issues arise and reference throughout this specification to golf clubs only should not be considered limiting.

A golf club has a shaft connected to a club head through an aperture, called a hosel, in the club head. The relative orientation of the club head with respect to the shaft is a critical element in the performance of the club. Two aspects are particularly important: the lie angle, which relates to an angle between the shaft and a lateral direction through the club head; and the loft angle, which relates to the slope of the club head with respect to a plane through the shaft and the club head. In essence, in the normal golfing stance with a golf club near the contact point with a golf ball, the lie corresponds to the angle between the shaft and the club head, while the loft corresponds to the degree of backward rotation of the club head with respect to the shaft. These two angles relate to rotations of the club head with respect to the shaft about two different axes.

Golf clubs for different shots generally will have different lie and loft angles. However, even for similar clubs (e.g., 8 irons) there is generally a range of lie and loft angles to suit different golfers.

Individual golfers may vary significantly in size, and have vastly differing athletic abilities, and therefore need a variety of custom configurations available to customize their golf equipment. Ideally a golfer should be easily able to change the following:

1. the club length
2. the grip type
3. the shaft type
4. the lie angle
5. the loft
6. the head weight and balance characteristics In general when a different golf club is required due to a change in the size or stance of the golfer, or a change in their ability, it is necessary to purchase a new club or to alter the existing one.

However the prior art methods for modifying a club are very limited. Specifically the methods used currently are:

1. The club length is only changed by removing the grip, cutting or extending the shaft, and gluing a new grip on.
2. The grip type is only changed by removing the grip, and gluing a new grip on.
3. The shaft type is changed with great difficulty by heating up the hosel area of the club with a gas torch to break the epoxy glue joint, and then gluing a new shaft in place, and waiting for the new glue to cure before playing with the club.
4. The lie angle is changed in a somewhat arbitrary way by applying a lever bar to the shaft (or club head) and pulling hard on the bar. This method can damage the club and is inaccurate.
5. The loft is changed in a similar manner to the lie angle as described immediately above. This method can also damage the club and is imprecise.
6. The head weight and balance characteristics are the only adjustments which have been improved upon in recent years, with some premium branded clubs having weight ports which, allow a set of weights inside the club head to be exchanged.

In particular there is no current method whereby the relative orientation of the shaft and club head can be adjusted for both lie angle and loft in a precise and controlled manner, nor any method of adjustment that does not have the potential (at least) to cause damage to the club. In practice, when a golfer wishes to change the lie angle or loft of a club it is generally necessary to purchase a new club, which adds extra cost to the golfer.

One consequence of this is the necessity for suppliers of golf clubs to maintain an inventory of clubs that cover the wide variation of lie and loft for each club. If a reliable and accurate method was available for varying the lie and loft of a club then it would be possible for a supplier to stock a smaller range of clubs which could be individually adjusted to the desired settings, thus saving costs to the supplier.

Another issue that could be addressed is the variation that can occur during manufacture of a golf club. It could be that a club may have a lie angle and/or loft that is different than that designated for the club as a consequence of manufacturing variation. It would be useful to have a method of correcting for this which could benefit the golfer by providing an accurately formed club, and the manufacturer/supplier in reduction of discarded clubs due to manufacturing error.

Adjustment of a golf club has been discussed here as an example of a common situation where adjustment of the relative orientation of two objects, in this case a shaft and a club head of a golf club. However the general situation is very common, especially where the orientation of an object with respect to a shaft is involved.

One common situation arises when an object is made to revolve about a shaft, such as a wheel or fan about its axle. In most instances a bearing is used to separate the revolving object from the axle. However, the revolving object can be unbalanced often causing unwanted forces to be applied to the bearing. This generally causes wear on the bearing and can result in the bearing requiring replacement sooner than would be the case for a balanced load.

One common cause of imbalance is a misalignment of the natural axis of rotation of the revolving object with the axis of the bearing. It would be useful to have a bearing that could be adjusted in order to align the axes.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Further aspects and advantages of the present invention will become apparent from the ensuing description which is given by way of example only.

DISCLOSURE OF INVENTION

According to one aspect of the present invention there is provided an adjustable connector including at least two parts, each having a main body with a bore having a longitudinal axis therein, wherein an external surface of the main body of a first part is configured to bear against an internal surface of the bore of a second part when the first part is at least partially inserted into the bore of the second part to form a connection characterized in that the positioning of the bores with respect to the main bodies is such that when the parts are connected to each other, rotation of one part with respect to the other changes the inclination of the longitudinal axes of the bores with respect to one another.

According to another aspect of the present invention there is provided an adjustable connector substantially as described above wherein, in use, the connector connects two or more objects such that rotation of one part of the connector with respect to the other changes the orientation of the objects with respect to one another.

Reference to an adjustable connector throughout this specification should be understood to refer to a device which, in use, is connected to, or forms part of, two or more objects, the device being configured such that adjustment of the adjustable connector alters the relative orientation of the objects.

In a preferred embodiment the main body of at least one part is symmetric with respect to rotation of the main body about a longitudinal axis of rotation.

Preferably at least the main body of the first part is symmetric with respect to rotation of the main body about a longitudinal axis of rotation.

A body that is symmetric with respect to rotation about an axis may generally be one in which a cross section through the body at right angles to the axis of rotation has a circular perimeter.

For example, the main body of the first part may be in the form of a solid cylinder (containing an internal bore). The axis of rotation of such a part is the imaginary line extending longitudinally through the central points of the cross section of the cylinder.

In a preferred embodiment the external surface of the main body of the first part is configured as a straight sided cylinder.

Reference to a straight sided cylinder throughout this specification should be understood to refer to a cylinder in which the cross section through the body at right angles to the axis of rotation has a circular perimeter of constant radius.

In a preferred embodiment the internal surface of the bore of the second part is configured to be complementary to the external surface of the main body of the first part.

Generally speaking two complementary bodies are configured such that when fitted together they form a complete whole—i.e., one body fills a hole in the other body. However, for the purposes of this specification it should be understood to mean that one body is shaped to substantially fill an aperture in the other body to the extent that the two bodies overlap. In other words as the main body of the first part is inserted into the bore of the second part it substantially fills the bore in the region where the two parts overlap. Furthermore, in the present invention the fit between the internal surface of the bore in the second part and the external surface of first part is such that the first part and second parts may be rotated with respect to one another.

This arrangement ensures that the external surface of the main body of the first part may be slidably engaged into the bore of the second part.

In this preferred embodiment the above means that the internal surface of the bore of the second part is also configured as a straight sided hollow cylinder of substantially the same radius as the external surface of the first part.

In some other embodiments the main body of a part may have a variable radius along the longitudinal axis while retaining rotational symmetry. For example, the radius could vary along the longitudinal axis to form a tapered or conical form, or a combination of tapered and straight sided (constant radius) sections. Such variable radius forms could be used, for example, to secure the main body of the part within a complementary aperture in another object. However, the main body of the part may still be able to rotate within the aperture.

In a preferred embodiment the main body of at least one part has a longitudinal axis which is inclined with respect to the longitudinal axis of the bore of that part.

The longitudinal axis of the bore may differ from the axis of rotation by being displaced laterally (i.e., the two axes are parallel but not collinear) or by being inclined to it (the two axes intersect at an angle). In each case rotation of the main body causes a similar rotation of the axis of the bore.

In a preferred embodiment the longitudinal axis of the bore of each part is inclined with respect to the axis of rotation of the main body of that part.

The angle between the axis of rotation of the main body of a part and the longitudinal axis of the bore of that part will be referred to as the angle of inclination of the bore.

In such embodiments rotation of the main body about its axis of rotation causes the longitudinal axis of the bore to rotate (at a constant angle of inclination) with respect to the axis of rotation of the main body. In this way the relative orientation (with respect to the axis of rotation of the main body) of an object connected to the main body of the part and another object connected to the bore of the part, may be altered.

In some embodiments the part may be connected to an object which itself has an axis of rotation, such as a straight cylindrical shaft for example. In such embodiments the main body of the part may be considered to be a section of the object to be connected. The section of the object forming the main body of the part in such embodiments includes a bore, wherein the longitudinal axis of the bore is different from the axis of rotation of the object.

In some embodiments it may be desirable to have a main body of a part that does not have rotational symmetry, that is, has a non-circular perimeter. A cam-shaped main body may be fitted to an object which has its own axis of rotation, such as a shaft having a bore that is inclined with respect to the axis of rotation of the shaft. In such instances it may be an advantage to use a part having a cam-shaped body that may be inserted into a complementary cam-shaped aperture in the shaft, as this will hinder or prevent the part from rotating with respect to the shaft. Rotation of the shaft may be used to alter the orientation between the longitudinal axis of the bore and the axis of rotation of the shaft.

In some embodiments a bore (or a main body) may include a spline, key detail, and/or ridges/grooves to limit rotation of the bore with respect to an object (such as the main body of another part or an object to be connected) in contact with it.

The adjustable connector of the present invention is formed by inserting the main body of the first part into the bore of the second part, the parts being configured such that the external surface of the main body of the first part bears against the internal surface of the bore of the second part. When connected in this manner the axis of rotation of the main body of the first part is collinear with (i.e., the same as) the longitudinal axis of the bore of the second part.

An adjustable connector formed in this way enables full rotation of the parts of the connector independently about two distinct axes of rotation, namely the axis of rotation of the second part and the longitudinal axis of the bore of the second part (the latter being the axis of rotation of the first part when engaged in the bore of the second part to form the connector). In a like manner, any objects connected to the parts may also be rotated independently about two distinct axes.

The amount of adjustment available is determined by the angles of inclination of the bores with respect to the main body of the parts. The maximum adjustment is given by the sum of the angles of inclination. This occurs when both axes of rotation are in the same plane and inclined in the same general direction. However, by rotating one of the parts with respect to the other (i.e., keeping one part fixed and rotating the other) it is possible to vary this from a minimum angle (equal to the difference between the two angles of inclination) up to the above maximum angle.

Furthermore, by rotating one of the parts only, so that the connector moves as a single unit, the same adjustment may be applied for any orientation through 360° C. about the axis of rotation of the part. Further adjustments may be made by combining the above actions, i.e., rotating the connector about one part together with rotation of the parts with respect to one another.

In a preferred embodiment at least one part includes marking configured to indicate the orientation of the part.

The marking may be a sequence of numbers, letters or any other distinguishable symbols or marks that may be used to identify the orientation of the part.

Preferably the first and second parts include marking configured to indicate their orientation with respect to one another when connected together.

For example the symbols could be arranged around the rims of the two parts so that they can be readily observed when the parts are assembled to form the adjustable connector. In this manner the relative orientation of the parts may be readily established by aligning the relevant symbols on each part.

Once the required alignment has been established the parts may be held in relationship to one another by various means, such as (without limitation) by gluing, clamping or the use of complementary ridges and grooves on the relevant surfaces of the parts.

Preferably the objects to be connected to the parts of the adjustable connector include marking configured to indicate the relative orientation of the object to the part.

In a preferred embodiment at least one part is configured as an auto locked mechanism.

Reference to an auto-locked mechanism throughout this specification should be understood to refer to a mechanism which by design, and by default, secures the elements (which may be telescoping) relative to each other. Typically an auto locked mechanism includes a body made from a deformable material. The body is designed such that a tool is required to change the shape of the body so as to accept an object to be connected, and such that the body locks onto the object when the tool is removed.

Throughout this specification the term deformable material should be taken as meaning a material which is able to deform from its original shape, and has a resilience or bias to return to its original shape, i.e. the deformable material has a material memory.

In the case of a deformable self-locked mechanism there may generally be an aperture for a tool and a tool designed to deform the body. This tool may be a:
1. ever
2. wedge
3. cam (elliptical or otherwise)
4. threaded element (tapered or otherwise)
5. conical element (solid, threaded, expandable or otherwise)
6. a drivable connection (e.g. a pin or taper)
7. an external tool such as modified pliers
8. application of heat to thermally expand an aperture or weaken a mechanical connection In a preferred embodiment at least one part is deformable.

In a preferred embodiment at least one part is made from a deformable material.

In a preferred embodiment at least one part includes a slot.

Reference to a slot should be understood to refer to a gap that extends through the external surface of the part into the bore and at least partially along the length of the bore.

In some embodiments the slot may extend at least partially along and around the part.

In other embodiments at least one part includes a deformable insert.

Preferably the second part of the adjustable connector is an auto locked device. In this embodiment the main body of the second part is made from a deformable material, including a slot. The slot may be helical, straight or otherwise, and extend partially or fully along the main body of the part.

A suitable tool may be used to expand the main body of the second part to allow the first part to be inserted into the bore of the second part. When the desired relative orientation of the parts has been set up, for example using the marking on the two parts, the tool may be removed resulting in the main body of the second part locking the first part in position. If subsequently a different orientation is required the tool may be reinserted to release the first part, the relative orientation of the parts adjusted and then the parts may be locked together by removal of the tool.

In use, the arrangement of the adjustable connector is such that the first object is connected to the bore of the first part and the second object is connected to the main body of the second part.

In a preferred embodiment at least one part is configured to engage with an object to be connected.

Preferably the first part is configured to engage with a first object to be connected and the second part is configured to engage with a second object to be connected.

Reference to a part being configured to engage with, or connected to, an object to be connected should be understood to include a part that is itself an integral section of that object. This would include, for example, those embodiments where one of the parts is a section of an object to be attached, as discussed above.

The use of an adjustable connector may be illustrated by application to a golf club. However, those skilled in the art will appreciate that there are many other examples that could be used and that reference to a golf club only should not be seen as limiting.

In a preferred embodiment the object to be connected is the shaft of a golf club.

In a preferred embodiment the object to be connected is the club head of a golf club.

Preferably the shaft of the golf club is connected to the bore of the first part of the connector, and the club head is connected to the main body of the second part. This arrangement recognizes that the bore of the first part may be readily configured to connect with a shaft, while the hosel in the club head may be readily configured to connect with the main body of the second part. However, in other embodiments the shaft may be connected to the main body of the second part and the club head connected to the first part (for example by forming an extension on the club head configured to connect with the bore of the first part).

In a preferred embodiment at least one part is releasably connected to an object to be connected.

The advantage of a releasable connection is that the object may be released if subsequent re-adjustment is required. This may save time and effort in making the adjustment, as well as reducing the likelihood of damage to the object or adjustable connector, in each case saving cost.

In a preferred embodiment the releasably connected part is connected by an auto-locked mechanism.

For example the hosel of a golf club may be configured to include an auto locked mechanism.

The hosel, and/or club head (where there is no hosel for example), may have one or more slots, helical, straight or otherwise, partial or full, and be of sufficient strength either as a unitary item or via the design and/or cooperation of multiple elements (which could include a conical, wedge, split or spring element for example). A suitable tool may be used to expand the hosel so that it may accept a part of the adjustable connector, with the part becoming locked in the hosel when the tool is removed.

Likewise, the shaft of a golf club may be configured to include an auto locked mechanism. The shaft may be made of a deformable material and include a slot such that operation of a suitable tool may open the shaft so as to accept a part of the adjustable connector. The shaft may be self-lock to the part on an interior or exterior surface part.

Where the hosel is a deformable body or where the shaft is a deformable body each may be designed so as to auto lock or otherwise frictionally engage with a part of the adjustable connector.

Throughout this specification the hosel may be taken to include any element in contact with itself. Likewise the shaft may include any element in contact with itself. An intermediary element (such as an adjustable connector) which connects the club head and or hosel with the shaft can be taken to be a shaft in some cases and a hosel in others.

In some embodiments the of the auto locked mechanism the shaft may have one or more slots and be expandable by insertion of a plug element which bears on the inner surface of the club shaft. The expansion element, which may be helical, solid, compressible, conical, or threaded (for example), may bear against a surface of the shaft and frictionally engage. An expansion element may also be inserted from the sole or underside of the club head.

Any inserted element may also or solely serve to alter the weight of the club. A plug may retain a lead weight for example within the shaft of the hosel, or the plug may be a heavy or light material to achieve a desired change in the weight.

In case of a non-deformable hosel aperture a simple connection may be made by an interference fit with the hosel. If the aperture of the hosel is so configured the inserted part of the adjustable connector could be dovetailed by interaction with a dovetail creation detail at the apex of the hosel.

All detail described for self-locked mechanisms could be used for locking mechanisms (as in a screwed in tapered element inserted to expand the split shaft), and vice versa. All details which describe the male form may be advantageously designed in the female form and vice versa.

A self-locked mechanism may use an attached integral or loose spring element. This element may be expanded, shortened or rotationally deformed to achieve a locking condition.

If a spring element is used a tapered tool could be used to insert inside or outside the spring to frictionally engage. Turning the spring or tool in one direction will tend to bind more than the other way and this can be used to advantage. Alternatively the tool may be tapered or parallel and the inner or outer bore of the spring element be itself tapered. In any case the elements may also be threaded.

Where a cam tool is used to open a self-locking mechanism it may be generally axially aligned to the axes of the hosel and shaft or be generally parallel to the axes of the hosel and shaft. However a cam may also be in any other orientation that affords a cam operation to release the part of the adjustable connector secured by the deformable body. A cam tool is a good design for use in cooperation with a self-locking deformable body mechanism as the lever force which opens/releases or disengages the elements, in this case a club head hosel or a golf shaft, can be defined to be insufficient to elastically deform the mechanism. The major axis of the cam cross section will define the maximal opening achievable by use of the tool.

The hosel may be in a variety of cross sections but a preferred embodiment is one which offers resistance to rotation of the shaft within the hosel. This can be achieved when the hosel and or shaft are oval or any other non-circular cross section for at least some of their length. Splines, key details, and ridges/grooves may be used for a similar purpose.

The hosel may be in a variety of cross sections but a preferred embodiment is one which offers resistance to pull out of the shaft. This may be achieved when the hosel is wider in internal bore at a point closer to the sole end, than the golf clubs grip end, and is oval or any other non-circular for at least some of their length. Splines, key details and ridges/grooves may be used for a similar purpose.

Where a hosel and club shaft are connected by an adjustable connector and the lie angle and loft has been adjusted, there may be a visual misalignment of the axes of the hosel and the shaft. To disguise the variable angle of the shaft relative to the hosel, or to the club head directly, a flexible or adjustable ferrule, O-ring (of any cross section) could be used. This ferrule detail may be separate, but may be click fitting or part of any of the adjacent parts. In this way variation of the shaft to club head angle may be visually disguised so the club would look more normal to the golfer's eye. This is important as golf is widely held to be as much a game of confidence as it is of pure physical skill.

An adjustable connector according to the present invention may provide a number of advantages over the prior art devices, including:

low manufacturing cost as a result of the simplicity of the parts;

simplicity of use, in that the required relative orientation of the parts may be dialed-up using the marking on the parts, and the parts subsequently locked in position;

precise adjustment is simplified by the use of marks on the parts to indicate their relative orientation;

quick locking and release of the parts through the use of one part as a self-locked mechanism to unlock the parts with a simple operation of a tool and to relock the parts by removal of the tool;

the parts of the connector may be configured to make a simple connection to other objects, especially when the' other objects are also configure as self-locked mechanisms. This may enable multiple adjustments to be made quickly and simply, with precision and without damaging the adjustable connector or the objects connected to it.

It has numerous applications, including in adjustment of golf clubs as illustrated here, in which case it provides a simple, precise and quick method for altering the lie angle and loft of a club, thus increasing the versatility of the club, enabling a reduction in inventory for suppliers and providing a simple way of correcting for variation during manufacture of the club.

According to another aspect of the present invention there is provided a bearing including at least two parts, each having a main body with a bore having a longitudinal axis therein, wherein an external surface of the main body of a first part is configured to bear against an internal surface of the bore of a second part when the first part is at least partially inserted into the bore of the second part to form a connection characterized in that the positioning of the bores with respect to the main bodies is such that when the parts are connected to each other, rotation of one part with respect to the other changes the inclination of the longitudinal axes of the bores with respect to one another wherein, in use, one part is freely rotatable with respect to the other part.

A bearing according to this aspect of the invention is an adjustable connector as described above wherein at least one part is free to rotate with respect to the other part. Typically one part of the bearing may be fixed, for example to a support structure, while the other freely rotatable part may be connected to an object to be rotated. The fixed part may be either the first part or the second part.

In one embodiment the bearing may include a third part configured to fit into the bore of the first part. The third part may be engaged with the bore of the first part in a manner that enables it to rotate freely with respect to the first part. In this embodiment the first and second parts may be adjusted as described above for an adjustable connector, with the third, free rotating part, configured to engage with an object to be rotated.

In some embodiments the bearing may include a guide, such as a ball race or low friction bearing. A guide, in the form of a ball race for example, may be used to connect the bore of the first part to the third part. Such a guide may provide additional stability and reduce friction between the parts.

A bearing according to this embodiment may provide the advantage of enabling adjustment of the axis of rotation of the object by manual adjustment of the relative orientation of the first and second parts. Such adjustment may be able to align the natural axis of rotation of the object with the axis of rotation of the bearing, thus reducing or eliminating any imbalance.

Alternatively, the bearing, in which one of the first or second parts is freely rotatable in use, may be self-aligning. It is well known that the forces on a rapidly spinning top are such as to tend to keep the top spinning on its natural axis of rotation. A bearing according to this embodiment may utilize these restoring forces to rotate the parts of the adjustable connector relative to one another so as to self-align the axes of rotation of the bearing and of the spinning object.

BRIEF DESCRIPTION OF DRAWINGS

Further aspects of the present invention will become apparent from the ensuing description which is given by way of example only and with reference to the accompanying drawings in which:

FIG. 9 shows schematic views of a club head and hosel according to another aspect of the present invention.

BEST MODES FOR CARRYING OUT THE INVENTION

Figure 1:
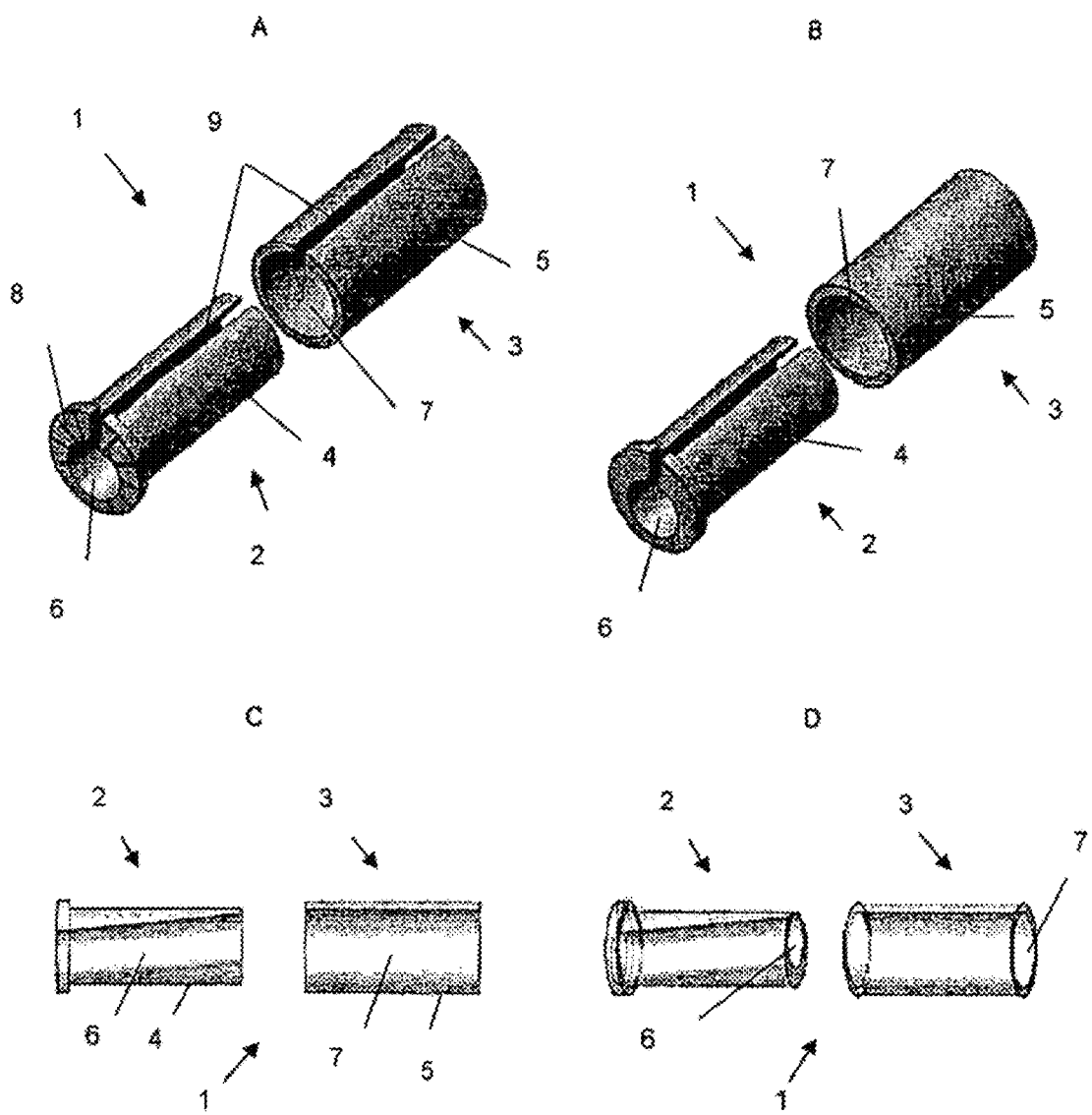
FIG. 1 shows a schematic representation of an adjustable connector according to one embodiment of the present invention.

An adjustable connector according to one embodiment of the present invention is indicated by arrow 1 in FIG. 1. A first part, indicated by arrow 2 has a main body (4) and an internal bore (6).

The main body (4) is shown in FIG. 1 as a straight sided cylinder. The axis of rotation of the main body (4) is an imaginary line running through the center points of the main body (4).

The bore (6) of the first part (2) is inclined with respect to the axis of rotation of the main body (4).

A second part (3) has a main body (5) in the form of a straight sided cylinder. The axis of rotation of the main body (5) is an imaginary line running through the center points of the main body (5). The second part (3) has a bore (7) as a longitudinal axis (not shown) that is inclined with respect to the axis of rotation of the main body (5).

The main body (2) includes marking (8) to indicate the relative orientation of the first body (2).

Both of the first part (2) and the second part (3) as illustrated in FIG. 1A include a slot (9) in the main body (2, 3).

The second part (3) as illustrated in FIG. 1B has a main body (5) without a slot.

Figure 2:
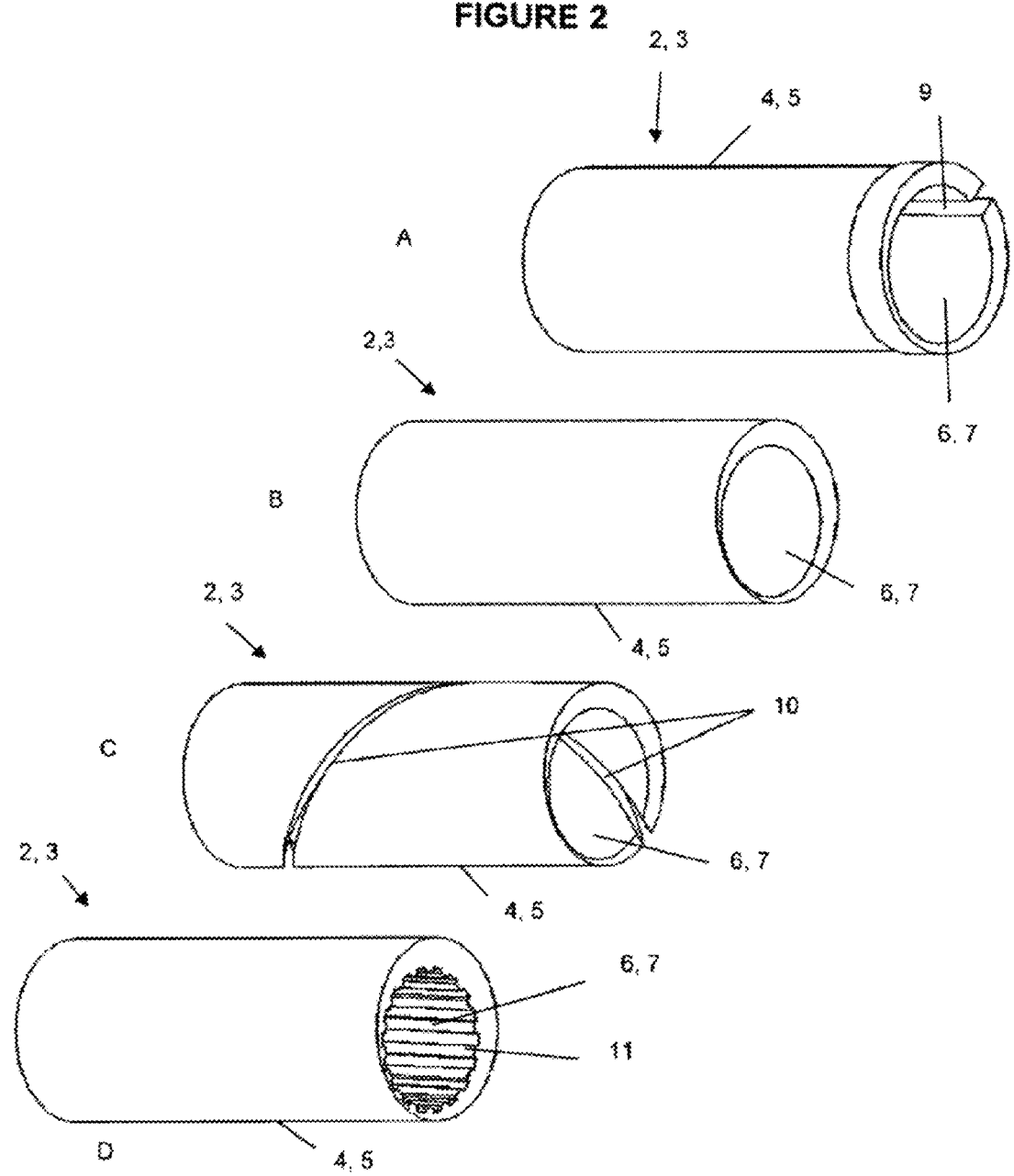
FIG. 2 shows schematic representations of parts of an adjustable connector according to one embodiment of the present invention.

FIG. 2 shows a number of variations to the parts (2, 3).

FIG. 2A shows a part (2, 3) having a main body (4, 5) and an internal bore (6, 7) that is inclined with respect to the axis of rotation of the main body (4, 5). The part (2, 3) includes a linear slot (9).

FIG. 2B indicates a part that is similar to that shown in FIG. 2A but without a slot.

FIG. 2C indicates another variation on the part shown in FIGS. 2A and 2B, in this case where the part (2, 3) includes a helical slot (10) that runs along and around the main body (4, 5).

FIG. 2D shows a part similar to that illustrated in FIG. 2B in which the internal service of the bore (6, 7) includes surface contours (11) in the form of ridges and grooves.

Figure 3:
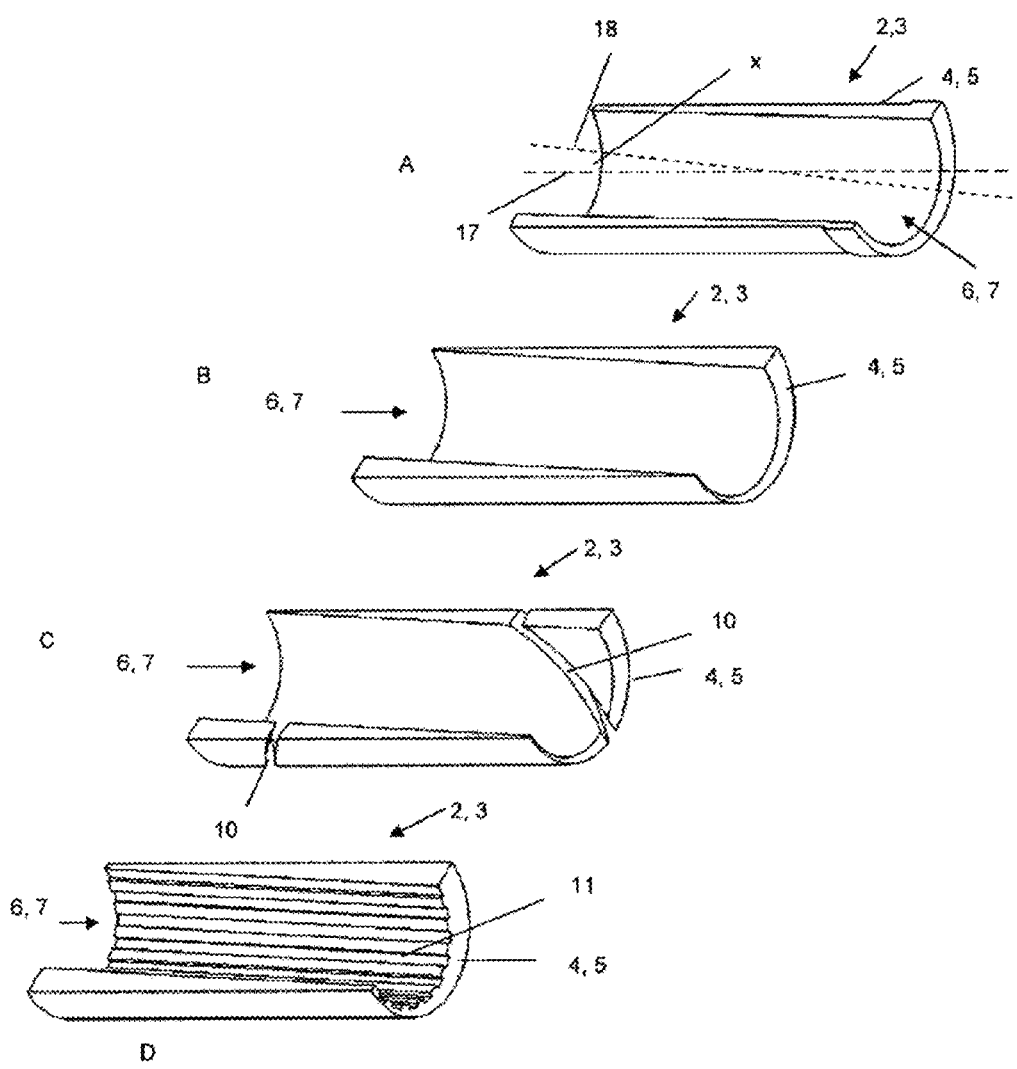
FIG. 3 shows schematic cross section views of parts of an adjustable connector according to one embodiment of the present invention.

FIG. 3 shows cutaway sections of the parts illustrated in FIG. 2. These cutaway views clearly show the inclination of the internal bore (6, 7) with respect to the axis of rotation of the main body (4, 5) of the parts (2, 3). The axis of rotation of the main body (4, 5) is indicated by dashed line 17 in FIG. 3A. The longitudinal axis of the bore (6, 7) is indicated by dashed line 18. The angle of inclination is the angle between these lines, denoted by a in FIG. 3A.

Figure 4:
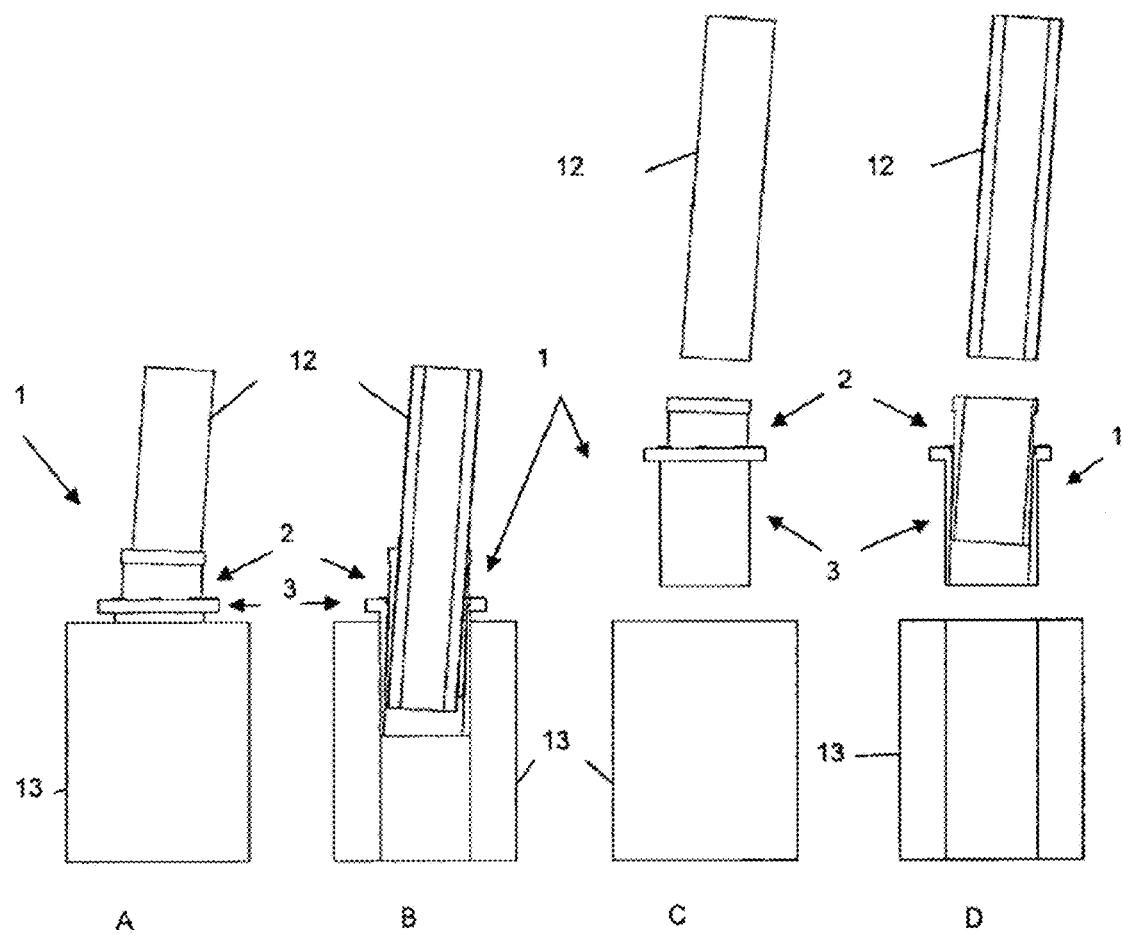
FIG. 4 shows an adjustable connector according to one embodiment of the present invention in use connecting two bodies together.

A stalemate view of an adjustable connector (1) in use connecting a first object (12) in the form of a shaft and a second object (13) is shown in FIG. 4A. A cutaway view of the same arrangement is shown in FIG. 4B. These two situations are repeated in FIGS. 4C and 4D which show exploded views of the situations illustrated in FIGS. 4A and 4B respectively. In particular, with reference to FIG. 4D the first part (2) and second part (3) of the adjustable connector (1) clearly show the change in orientation due to the inclined bores of the two parts (2, 3) at this particular setting of the relative orientation of the parts (2, 3).

In use the relative orientation of the parts (2, 3) is first set to the desired orientation. This may be done for example by using a look up table to determine the correct setting, as indicated by the markings on the parts (2, 3). A set of tables may be provided with the various parts, each table being specific to the particular inclination of the bores within each adjustable connector (1).

Once the setting has been arranged, the parts (2, 3) may be locked together, for example by application of glue or preferably using a self-locking mechanism on the main body of the second part (3) in order to lock the first part (2) in position. In other cases the second object to be connected (13) is configured to include a self-locked mechanism. In these embodiments a tool may be used to open the aperture in the second object to be attached (13) to allow the adjustable connector (1) to be inserted into the aperture. When at least partially inserted the tool may be removed from the auto locked mechanism causing the object (13) to attempt to return to its normal size and in so doing to clamp against the main body of the second part (3) locking both it and the first part (2) in position.

Figure 5:
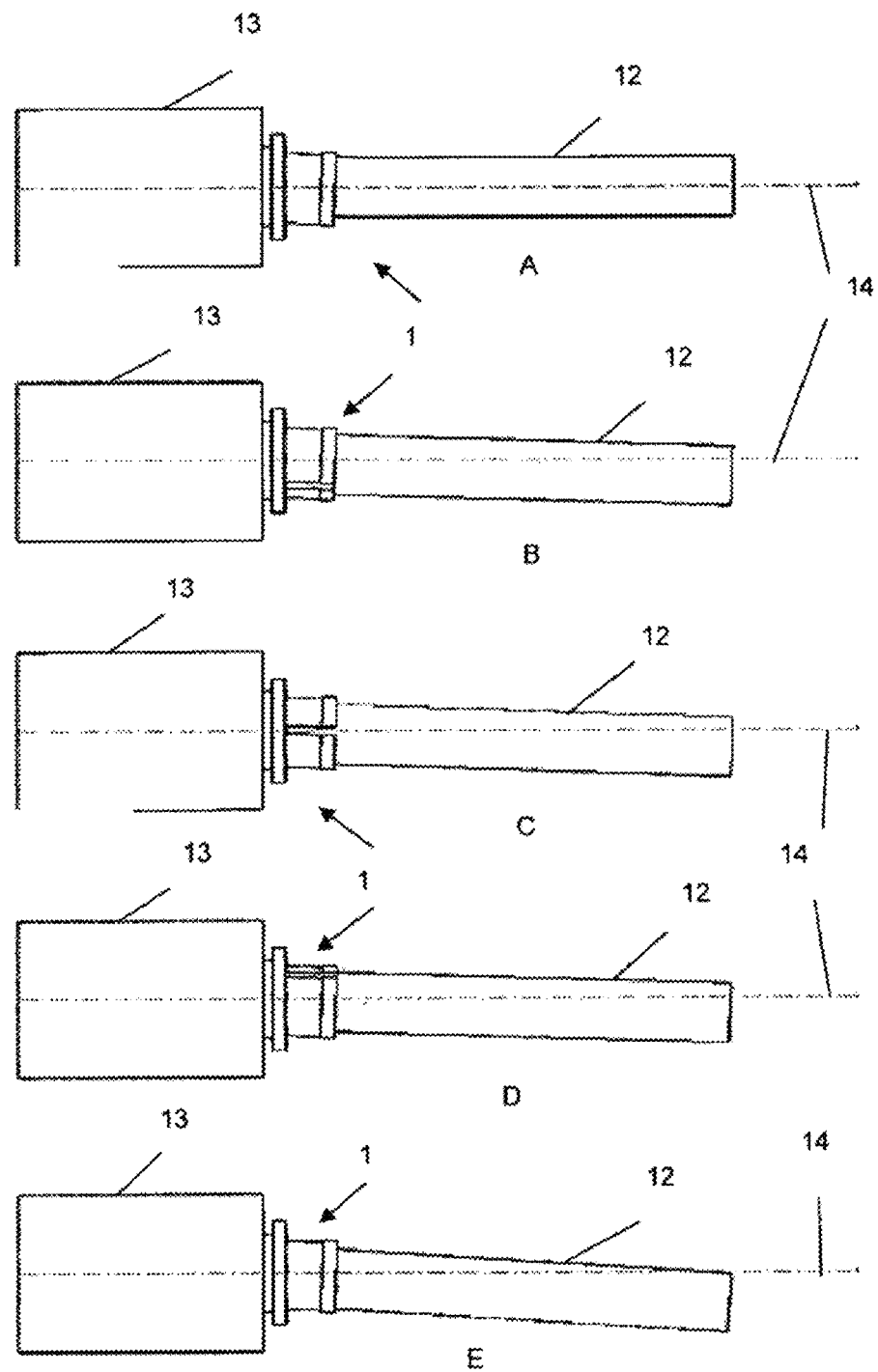
FIG. 5 shows schematic drawings of an adjustable connector.

Similarly, the first object to be connected (12) may include a self-locked mechanism configured to engage with the first part (2), thus forming a locked connection between the first part to be connected (12) and the second part to be connected (13) via the adjustable connector (1). A wide range of different orientations is available by setting different relative orientations for the first part (2) with respect to the second part (3) of the adjustable connector (1), as illustrated in FIG. 5. The situation illustrated here is similar to that shown in FIG. 4. The axis of rotation for the second part (3) is indicated by dashed line (14). In comparison of the angle of inclination of the shaft (12) with respect to the axis of rotation (14) indicates our changing the relative orientation of the parts (2) and (3) with respect to one another alters the angle.

Figure 6:
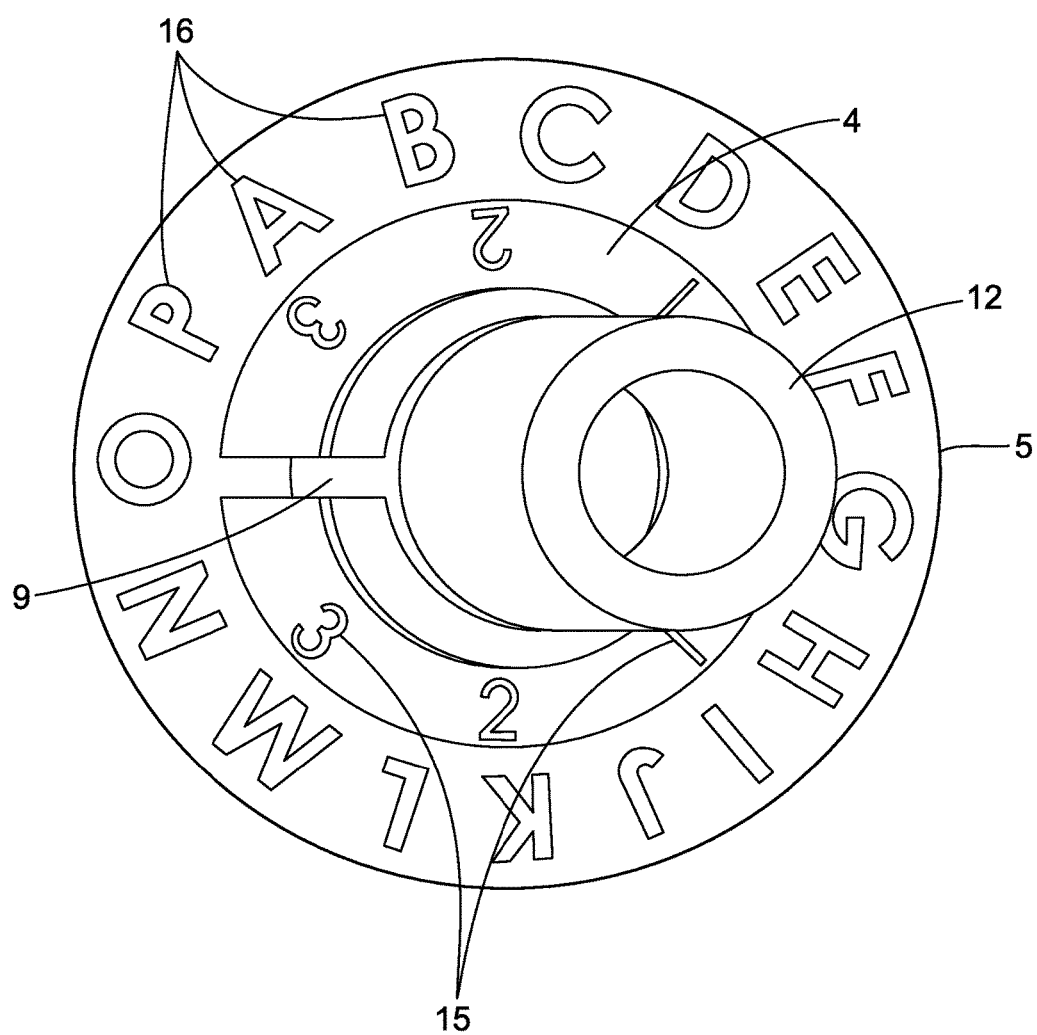
FIG. 6 shows a schematic view of an adjustable connector according to one embodiment of the present invention.

Applying marks to the first and second parts of the adjustable connector simplifies the setting of the connector, as well as providing a degree of precision in the setting. FIG. 6 indicates one arrangement in which marks, in the form of numbers (15) are placed around the main body (4) of the first part. Similarly marking, in the form of letters (16) may be applied around the main body (5) of the second part. The arrangement shown in FIG. 6 includes a shaft (12) connected to the adjustable connector, and a slot (9) in the body of the first part.

Figure 7:
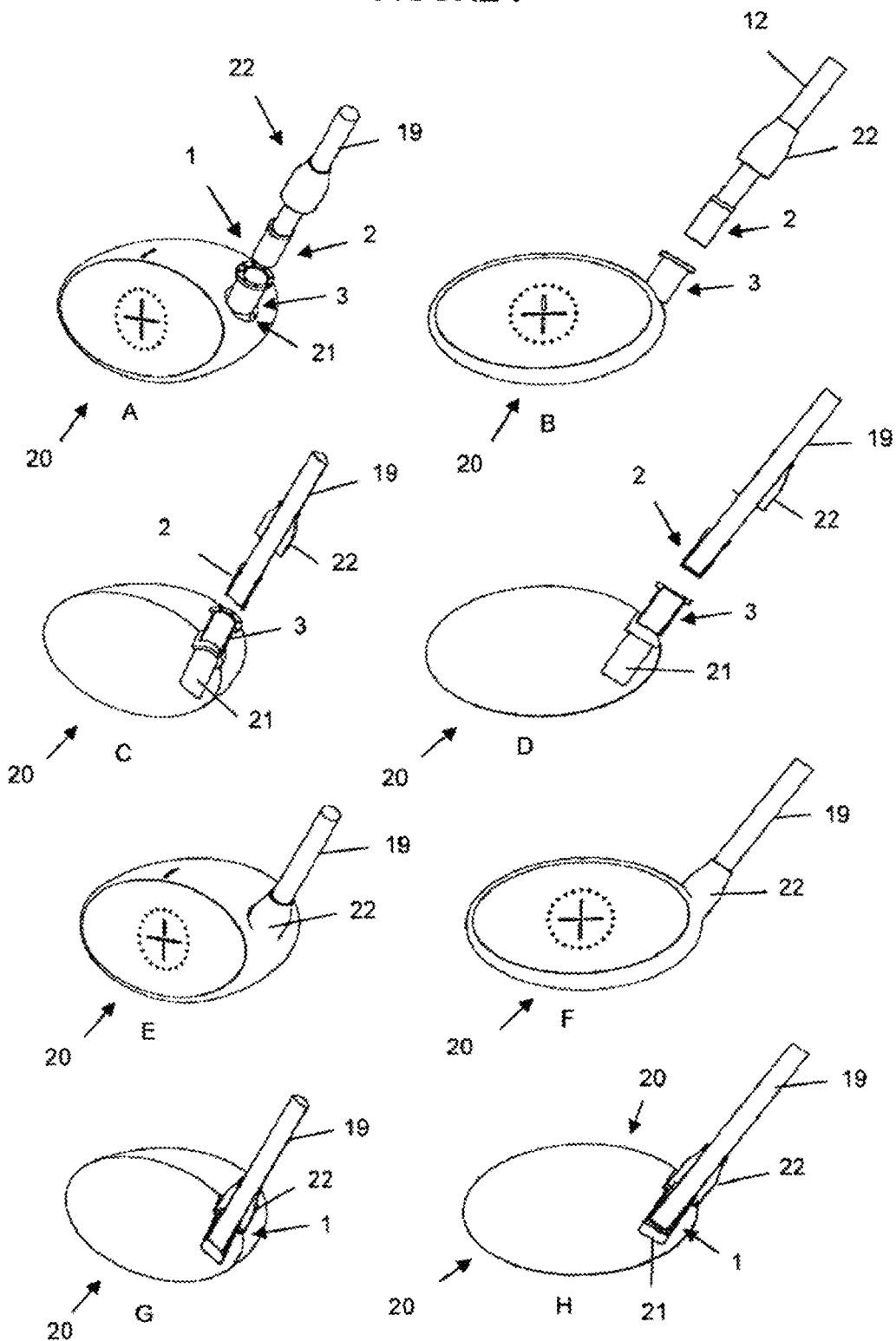
FIG. 7 shows an adjustable golf club according to one embodiment of the present invention.
Figure 8:
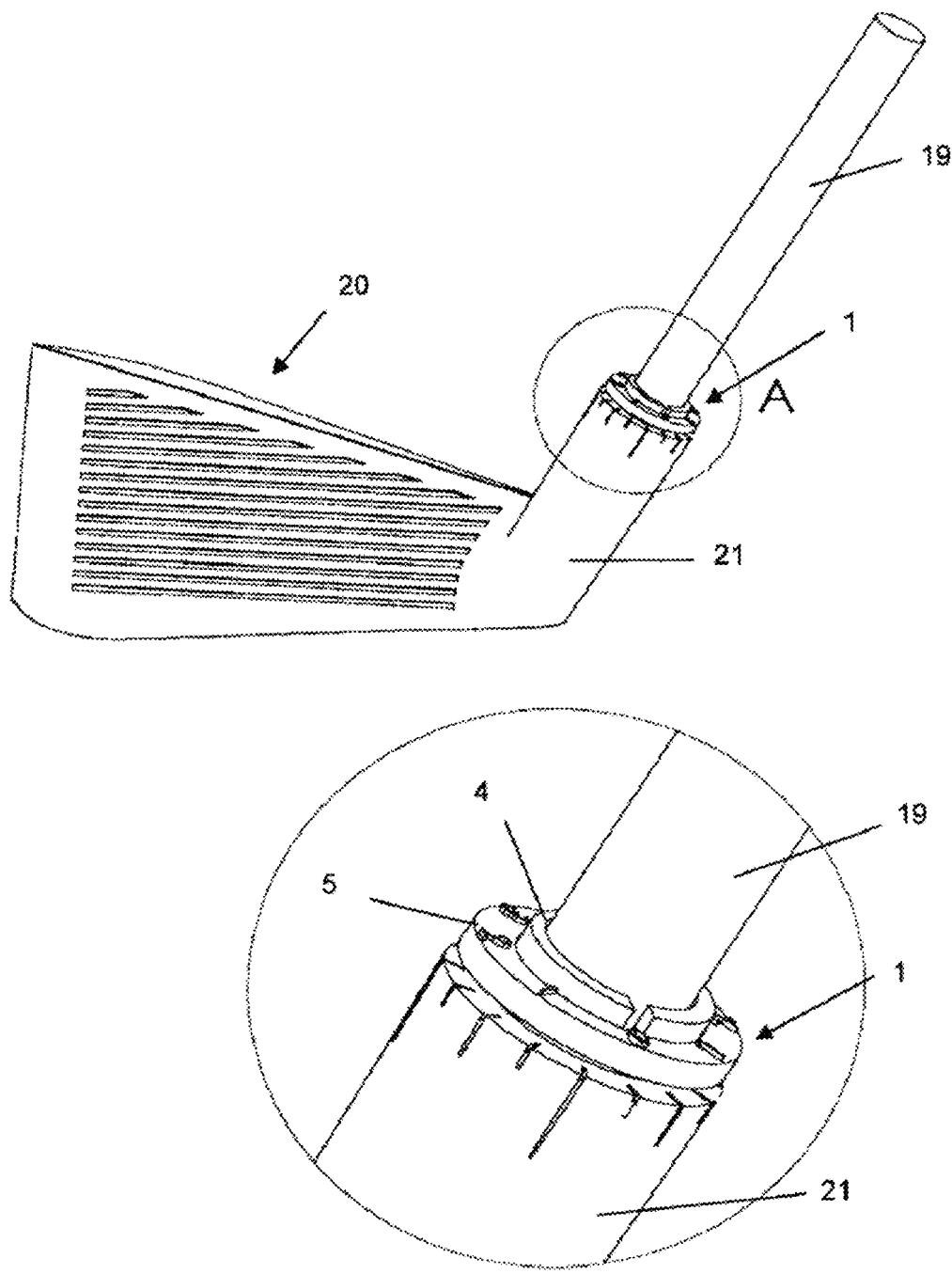
FIG. 8 shows an adjustable golf club according to another aspect of the present invention.

An adjustable golf club in which an adjustable connector (1) is used to connect a shaft of a golf club (19) to a club head (20) is shown in various views in FIG. 7. FIG. 7A shows an exploded view of the connector arrangement in which the first part (2) of the adjustable connector (1) is connected to the shaft of the golf club (19). The second part (3) of the connector (1) is shown just above the hosel (21) of the club head (20). A cover in the form of a ferrule (22) is shown attached to the shaft (19). FIG. 7B shows a similar arrangement from a different aspect. FIG. 7C is a cutaway view through the club head (20) showing the second part (3) inserted into the hosel (21). FIGS. 7E and F show the finished arrangement with the shaft (19) connected to the club head (20) with the adjustable connector (1) embedded to the hosel (21). The ferrule (22) is used to cover the connection mechanism and to mask any slight offset there may be due to the adjustment mechanism. These views are shown in cross section in FIGS. 7G and H. An adjustable golf club in the form of an iron is shown in FIG. 8 with the adjustable connector (1) embedded in the hosel (21) of the club head (20).

Figure 10:
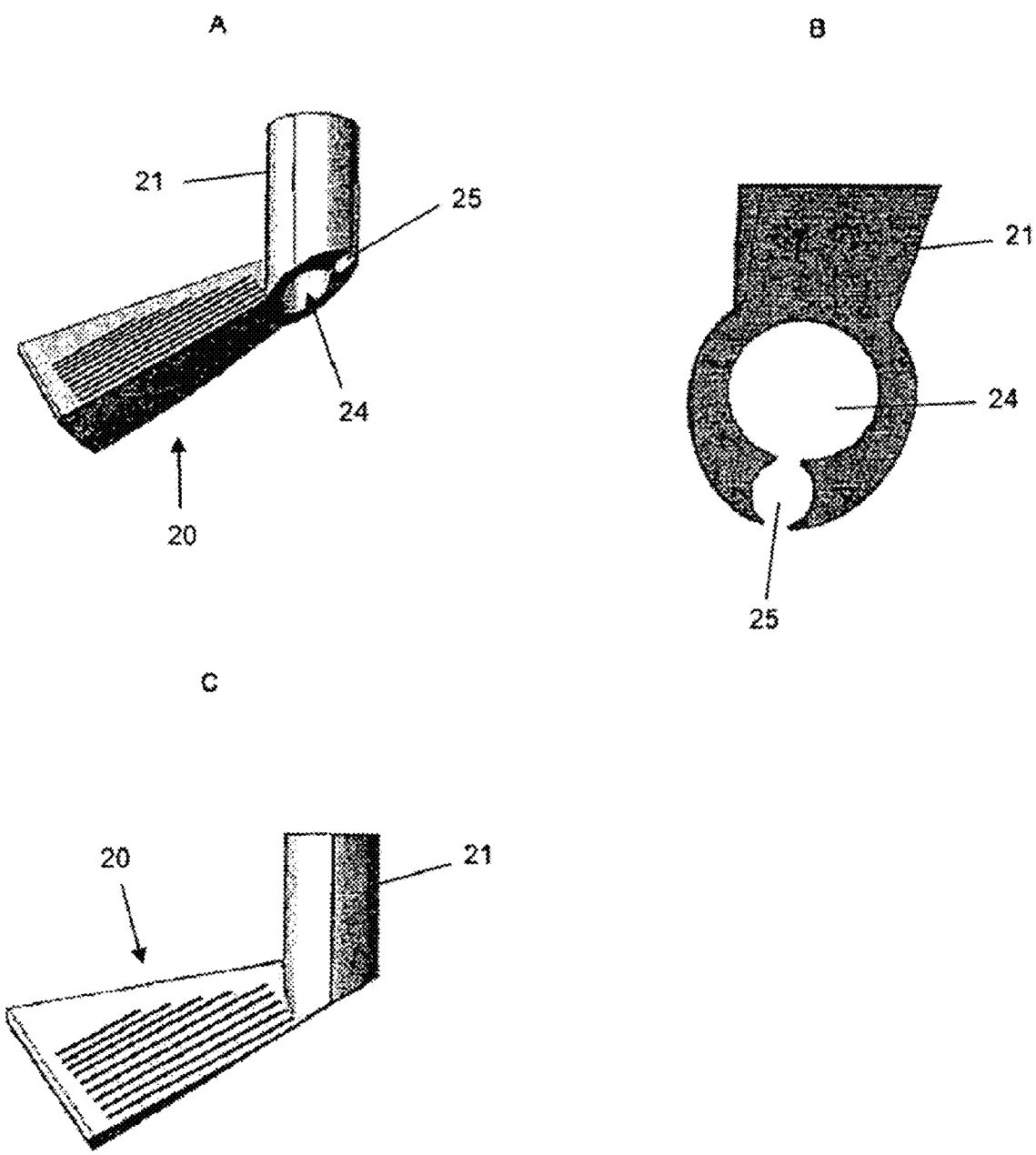
FIG. 10 shows views of a club head and hosel according to another aspect of the present invention.

FIG. 9 shows a variety of modifications to a club head (20) including the provision of a slot (23) through the body of the hosel (21) so that the hosel may be used as a self-locking mechanism. Also shown in the plan view of a hosel in FIG. 9B is an aperture through the hosel which is tapered (see FIG. 9B) and, in FIGS. 9A and D an aperture in the hosel which is non-circular. A hosel (21) including two apertures is shown in FIG. 10. With reference for example to FIG. 10B a first aperture (24) configured to accept the adjustment mechanism (not shown) and a second aperture (25) into which a tool, for example a cam tool, is inserted to open the hosel to a size where it can accept the adjustable connector. This is one example of how the hosel/club head may be used as a self-locked mechanism.

Figure 11:
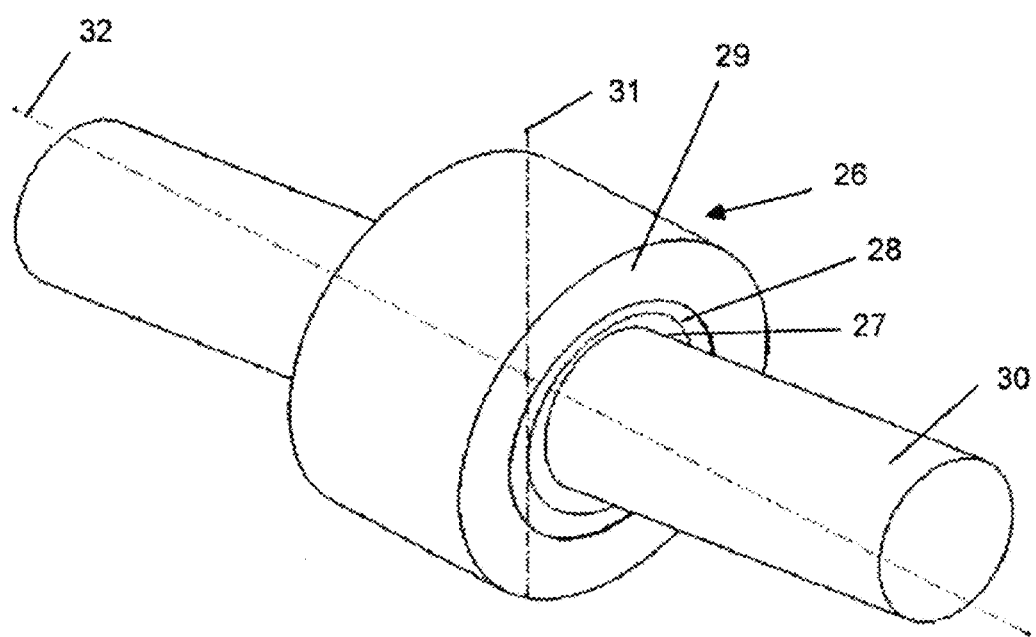
FIG. 11 shows a bearing according to another aspect of the present invention.
Figure 12:
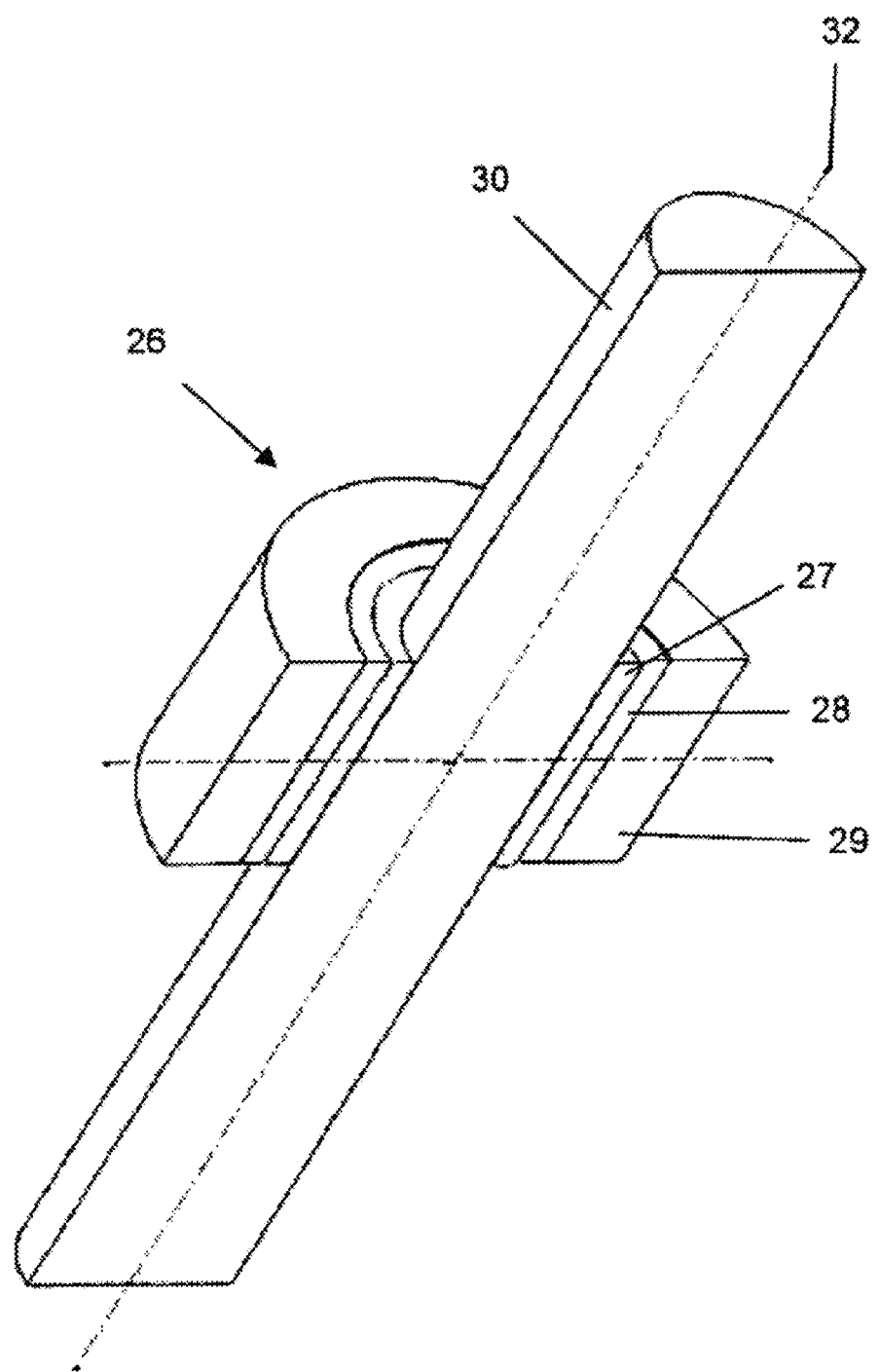
FIG. 12 shows a schematic cross sectional view of a bearing according to one embodiment of the present invention.

A bearing accordingly the present invention is illustrated in use in FIG. 11. The bearing, indicated by arrow 26 includes a first part (27) and a second part (28) in which the parts (27 and 28) have a similar form to the parts of the adjustable connector as illustrated in FIGS. 1-6. The bearing includes a bearing support (29) and is shown in FIG. 11 attached to shaft (30) that is free to rotate. The arrangement in the bearing is such that the first part (27) is free to rotate with the shaft (30).

In use, the relative orientation of the parts (27 and 28) may be adjusted as outlined above for the adjustable connector in order to realign the shaft (30) with respect to the bearing (26) (if required). In this embodiment the relative orientation of the first part (27) to the second part (28) is fixed and a third part, such as a sleeve is inserted into the bore of the first part (27) so that the sleeve may freely rotate with the shaft (30). The axis (31 and 32) shown as dash lines in FIG. 11 indicate the normal main axis of a bearing.

In embodiments where the first part (27) is freely rotatable in the bore of the second part (28) the bearing may self-center as the shaft spins through the action of the restoring forces of the shaft that may arise due to any misalignment or unbalancing of the shaft or any weight attached to it which causes the first part (27) to re-orientate with respect to the second part (28) to bring the bearing back into alignment.

Aspects of the present invention have been described by way of example only and it should be appreciated that modifications and additions may be made thereto without departing from the scope thereof as defined in the appended claims.

I claim:

1. An adjustable connector to connect a golf club head and a golf club shaft, the adjustable connector comprising:
   a first part having an outer wall configured to be inserted into a hosel of a golf club head and configured to rotate inside the hosel between a first plurality of rotational positions, said first part having a first internal inclined bore; and
   a second part configured to be coupled to a shaft and having an outer wall received in said first internal inclined bore, said second part being rotatably repositionable within said first internal inclined bore between a second plurality of rotational positions, said second part having a second internal inclined bore configured to receive the shaft; and
   wherein the first internal inclined bore includes a spline, key detail, or ridges and grooves that inhibit rotation of the second part with respect to first part when the second part is received within the first internal inclined bore.

2. An adjustable connector as claimed in claim 1 wherein the first and the second inclined bores are inclined with respect to a longitudinal axis of the bore of that part.

3. An adjustable connector as claimed in claim 1 wherein the outer wall of the first part is a straight-sided cylinder.

4. An adjustable connector as claimed in claim 1 wherein at least one part includes a marking configured to indicate the orientation of the part.

5. An adjustable connector as claimed in claim 1 wherein at least one part is configured to be releasably connected to either the golf club shaft or the golf club head.

6. An adjustable connector as claimed in claim 1 wherein the second part is slidably received within the first part.

7. An adjustable connector as claimed in claim 1, wherein rotating the first part through the first plurality of rotational positions changes a first angular relationship between the golf club head and the golf club shaft.

8. An adjustable connector as claimed in claim 7, wherein rotating the second part through the second plurality of rotational positions changes a second angular relationship between the golf club head and the golf club shaft, wherein the second angular relationship is independent of the first angular relationship.

9. An adjustable connector as claimed in claim 8, wherein the first and second angular relationships are a lie angle of a golf club head and a loft angle of said golf club head.

10. An adjustable connector as claimed in claim 8, wherein the first and second angular relationships are a loft angle of a golf club head and a face angle of said golf club head.

11. An adjustable connector to connect a golf club head and a golf club shaft, the adjustable connector comprising a pair of radially nested mutually independently rotatable members, one of said members having an outer wall disposed within the golf club head and the other of said members having a bore having the golf club shaft disposed therein, both members having inclined bores whereby two angular relationship parameters between said golf club head and said golf club shaft may be adjusted independently of each other; and
   wherein the at least one of the rotatable members includes a spline, key detail, or ridges and grooves that inhibits relative rotation between the rotatable members when in the radially nested arrangement.

12. An adjustable connector as claimed in claim 11 wherein the inclined bores are inclined with respect to a longitudinal axis of the bore of that member.

13. An adjustable connector as claimed in claim 11 wherein at least one member includes a marking configured to indicate the orientation of the member.

14. An adjustable connector as claimed in claim 13, wherein the marking includes a sequence of numbers.

15. An adjustable connector as claimed in claim 14, wherein the sequence of numbers is arranged around one or more of a rim of the first part and a rim of the second part.

16. An adjustable connector as claimed in claim 11 wherein at least one member is configured to be releasably connected to either the shaft or the head.

17. An adjustable connector as claimed in claim 11, wherein the two angular relationship parameters are two of the following: a lie angle of the head, a loft angle of the head, and a face angle of the head.

* * * * *